April 12, 1966 C. B. STENVALL 3,245,855
METHOD FOR MAKING ADHESIVE BANDAGE
Filed Jan. 18, 1962 2 Sheets-Sheet 1
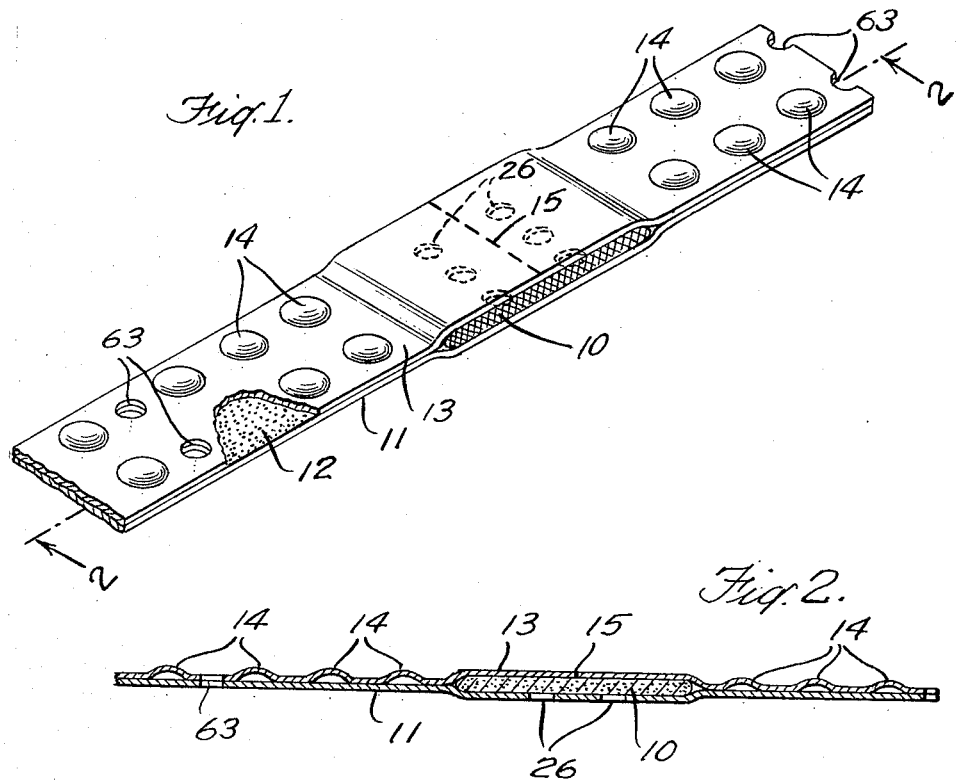
INVENTOR
CARL B. STENVALL
BY /s/ N. L. Leek
ATTORNEY April 12, 1966  C. B. STENVALL  3,245,855
METHOD FOR MAKING ADHESIVE BANDAGE Filed Jan. 18, 1962  2 Sheets-Sheet 2

INVENTOR
CARL B. STENVALL
BY
ATTORNEY

United States Patent Office 3,245,855
Patented Apr. 12, 1966

3,245,855
METHOD FOR MAKING ADHESIVE BANDAGE
Carl B. Stenvall, Portchester, N.Y.
(15 River St., New Rochelle, N.Y.)
Filed Jan. 18, 1962, Ser. No. 168,023
2 Claims. (Cl. 156—152)

This invention relates to bandage of the type having pads of absorbent material and adhesive backing strips for securing the bandage in place and having a removable protective cover strip disposed over the adhesive face of the backing strip, and to a method of making the same.

An object is to provide a bandage of the above type wherein the cover strip is easily removable when the bandage is to be used.

Another object is to provide a bandage of the above type having novel and improved characteristics.

Another object is to provide a backing strip package wherein the backing strip is formed on a carrier strip of a type which is suited for use as the cover strip for the bandage.

Various other objects and advantages will be apparent as the nature of the invention is more fully described.

The nature of the invention will be better understood from the following description taken in connection with the accompanying drawings in which a specific embodiment has been set forth for purposes of illustration.

In the drawings:

FIG. 1 is a perspective of a bandage embodying the invention;

FIG. 2 is a longitudinal section taken on the line 2—2 of FIG. 1;

FIG. 3 is a detail of the face of the cover strip;

Figure 4:
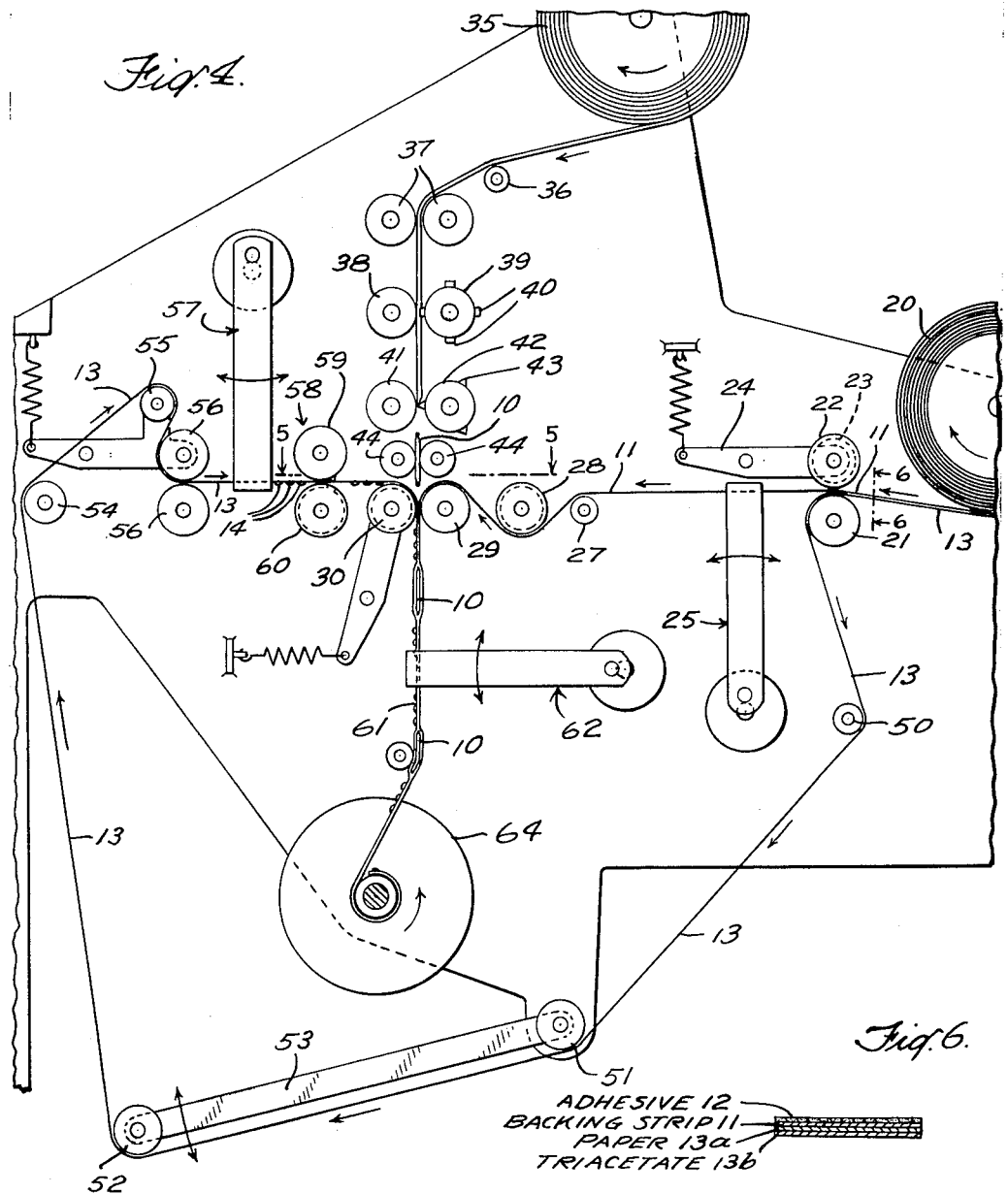
FIG. 4 is a diagrammatic view of a machine for making the bandage of FIGS. 1 to 3.

Referring to the drawings more in detail the invention is shown as applied to a bandage of the type comprising a pad 10 of absorbent material, such as cotton or the like, and a backing strip 11 of thin material such as plastic or fabric having a coating 12 of pressure sensitive adhesive material on one face thereof. The backing strip 11, for example, may be composed of polyvinyl chloride or other strong thin plastic material. The pad 10 is secured to the adhesive 12 with the strip 11 extending beyond the pad on both sides.

A protective cover strip 13 is disposed over the adhesive face 12 of the backing strip 11 and over the under surface of the pad 10 to protect the adhesive face until the bandage is to be used. The cover strip 13 may be composed of a plastic layer 13b plastic such as cellulose triacetate laminated to a layer 13a of paper for reinforcement and stiffening.

According to this invention the bond between the cellulose triacetate layer 13b and the adhesive coating 12 is reduced by decreasing the area of contact between the cover strip and the adhesive while at the same time maintaining a seal around the entire surface of the adhesive. This is accomplished by forming a series of indentations 14 in the surface of the strip 13. These indentations 14 are disposed in the areas of the strip 13 which overlie the adhesive areas of the strip 11, leaving the central portion of the cover strip which covers the pad 10 in flat condition so as to completely seal off the under surface of the pad. The indentations 14 are spaced from the edges of the cover strip 13 so that the entire marginal edge of the strip 13 seals against the adhesive 12 to form a hermetic seal for the adhesive. This is necessary to avoid oxidation of the adhesive as well as to prevent contamination.

These indentations 14 are of a depth such that the strip 13 does not contact and adhere to the adhesive in the areas of the indentations, but is securely sealed to the adhesive in the marginal areas around the indentations. In this way the area of contact with the adhesive can be reduced by as much as one half or more without exposing any of the adhesive coating. The cover strip can readily be stripped from the adhesive when the bandage is to be used due to the decreased bonding area.

While the indentations have been shown as circular it is obvious that they may be made of various shapes or a single central indentation may be used leaving a sealing margin around the outer periphery of the cover strip. In any event the indentations have a depth such that the corresponding parts of the cover strip 13 do not contact the adhesive layer on the strip 11.

Figure 6:
FIG. 6 is an enlarged section of the composite strip taken on the line 6—6 of FIG. 4.

As indicated in FIGS. 4 and 6 a supply reel 20 is composed of a composite strip wherein the cellulose triacetate layer 13b is cast on one side of a paper layer 13a and the backing strip 11 is cast onto the opposite side of the paper layer and is coated with a suitable pressure sensitive adhesive 12. When this composite strip is rolled to form the reel 20 the layer 13b of one convolution contacts the adhesive 12 of the next convolution. Hence the adhesive should be of a type which does not bond permanently to the material of the layer 13b.

Figure 5:
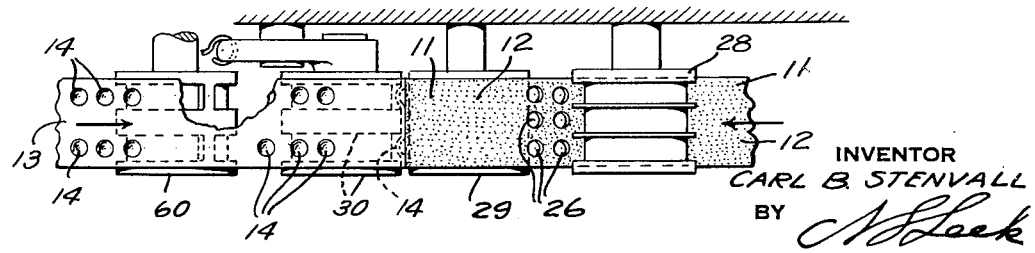
FIG. 5 is an enlarged section taken on the line 5—5 of FIG. 4.

A method and apparatus for making the improved bandage is shown in FIGS. 4 and 5 wherein the composite strip is unwound from the reel 20 by means of a feed roll 21 and a pressure roll 22. The feed roll 21 may be driven by any suitable means. Since the pressure roll 22 is in contact with the adhesive surface 12 of the backing strip 11 it is grooved circumferentially to form annular ribs 23 which reduce the area of contact with the adhesive surface 12 of the strip 11. The roll 22 is spring pressed against the strip 11 by means of an arm 24.

From the rolls 21 and 22 the strip 11 passes under a punching station 25 wherein vent holes 26 are punched in the strip. The punching station 25 may be of any standard type adapted to punch the holes 26 at spaced points along the strip and preferably is of the type adapted to advance with the strip and return in a repeated cycle so as not to interrupt the feed of the strip. The vent holes 26 are so spaced as to be disposed over the pad 10 as shown in FIG. 1.

From the punching station 25 the strip 11 passes over a guide roll 27, under a grooved guide roll 28, and over a guide roll 29, forming a bite with a guide roll 30.

The bandage pad material is derived in strip form from a supply roll 35. This material may comprise folded gauze or absorbent pads of cotton or the like covered by a folded strip of gauze. In any case the gauze may be impregnated with a pressure sensitive adhesive such as rubber latex so that the ends of the pads can be bonded by the application of suitable pressure to the gauze. This bonding of the ends of the pads prevents the gauze from ravelling or forming loose ends when the strip is cut into pad lengths. The impregnation should of course be carried out so as to avoid sealing over the openings in the gauze and thereby interfering with the absorbent characteristics of the pad. If sufficient crushing force is applied to the gauze it has been found that the cellulosic fibers tend to bond together even in the absence of a pressure sensitive adhesive. Hence by applying suitable pressure the ends of the cotton fillers or of the gauze itself may be suitably bonded to prevent ravelling either in the impregnated or unimpregnated state. When the strip is composed of an absorbent filler enclosed in a folded gauze cover the filler may be interrupted in the pressure sealed areas so that the outer layers of the gauze cover can be brought into sealing contact.

From the supply roll 35 the bandage strip is passed over a guide roll 36 and feed rolls 37 to a pair of crushing rolls 38 and 39. The roll 39 is provided with cross ribs 40 adapted to apply sealing pressure to the strip in spaced transverse areas for bonding the gauze or cellulosic material for the above purposes. The strip then passes cutting rolls 41 and 42 which cut the strip into individual pads 10. The roll 42 carries knives 43 which are disposed to cut the strip in the bonded areas.

The cut pads 10 are fed by feed rolls 44 into the bite between rolls 29 and 30 in contact with the adhesive face 12 of the strip 11 at spaced points.

From the feed roll 21, the carrier strip 13 passes around guide rolls 50 and 51, tension control 52 mounted on arm 53, guide rolls 54 and 55 and feed rolls 56 to an embossing station 57 adapted to form the indentations 14. From the embossing station 57 the strip 13 passes scoring station 58 comprising a scoring roll 59 and a backing roll 60, thence to guide roll 30 where the strip 13 is brought into pressure engagement with the pads 10 and the adhesive face 12 of the strip 11 to form a bandage strip 61.

The strip 61 then passes a punching station 62 similar to the punching station 25 where a series of indexing holes 63 are punched in the strip. The strip 61 is then reeled onto a roll 64. The indexing holes 63 are to facilitate the cutting of the strip 61 into individual bandages as shown in FIG. 1.

The pressure roll 30 is formed with circumferential ribs adapted to engage the strip 13 at its marginal edges and between the areas of indentations so as to press the correspoding portions of the strip against the adhesive 12 without deforming the indentations 14.

It will be noted that in this embodiment the carrier strip which is dispensed with the adhesive tape strip and which is normally stripped from the tape and discarded is utilized as the cover strip for the finished bandage.

Other embodiments will be apparent to a person skilled in the art.

What is claimed is:

1. The method of making a bandage from a composite strip comprising a paper carrier strip having on one side a layer of plastic material and on the other side a backing strip having a pressure sensitive adhesive coating which comprises stripping said paper carrier strip together with said plastic material from said backing strip, punching ventilating holes in said backing strip at spaced points, disposing bandage pads on said adhesive coating in registration with said ventilating holes, embossing the surface of said plastic material to form a series of indentations therein, bringing said embossed surface into contact with said adhesive with said indentations disposed between successive pads thereon to form a cover strip for said adhesive, and pressure sealing said cover strip to said adhesive to form a bandage strip.

2. The method set forth in claim 1, wherein the plastic material comprises cellulose triacetate.

References Cited by the Examiner

UNITED STATES PATENTS

| 1,823,278 | 9/1931 | Martin | 161—406 XR |
| 2,633,128 | 3/1953 | Schaefer | 128—156 |
| 2,703,083 | 3/1955 | Gross | 128—156 |
| 2,862,846 | 12/1958 | Blackford et al. | 156—249 |

EARL M. BERGERT, *Primary Examiner.*